3,506,553
PROCESS FOR PRODUCING CHLORINATED
HYDROCARBONS
Henry O. Mottern, Far Hills, and James P. Russell,
Berkeley Heights, N.J., assignors to Air Reduction
Company, Incorporated, New York, N.Y., a corporation of New York
Filed Mar. 31, 1967, Ser. No. 627,446
Int. Cl. B01j 1/10; C07c 17/00
U.S. Cl. 204—163                    10 Claims

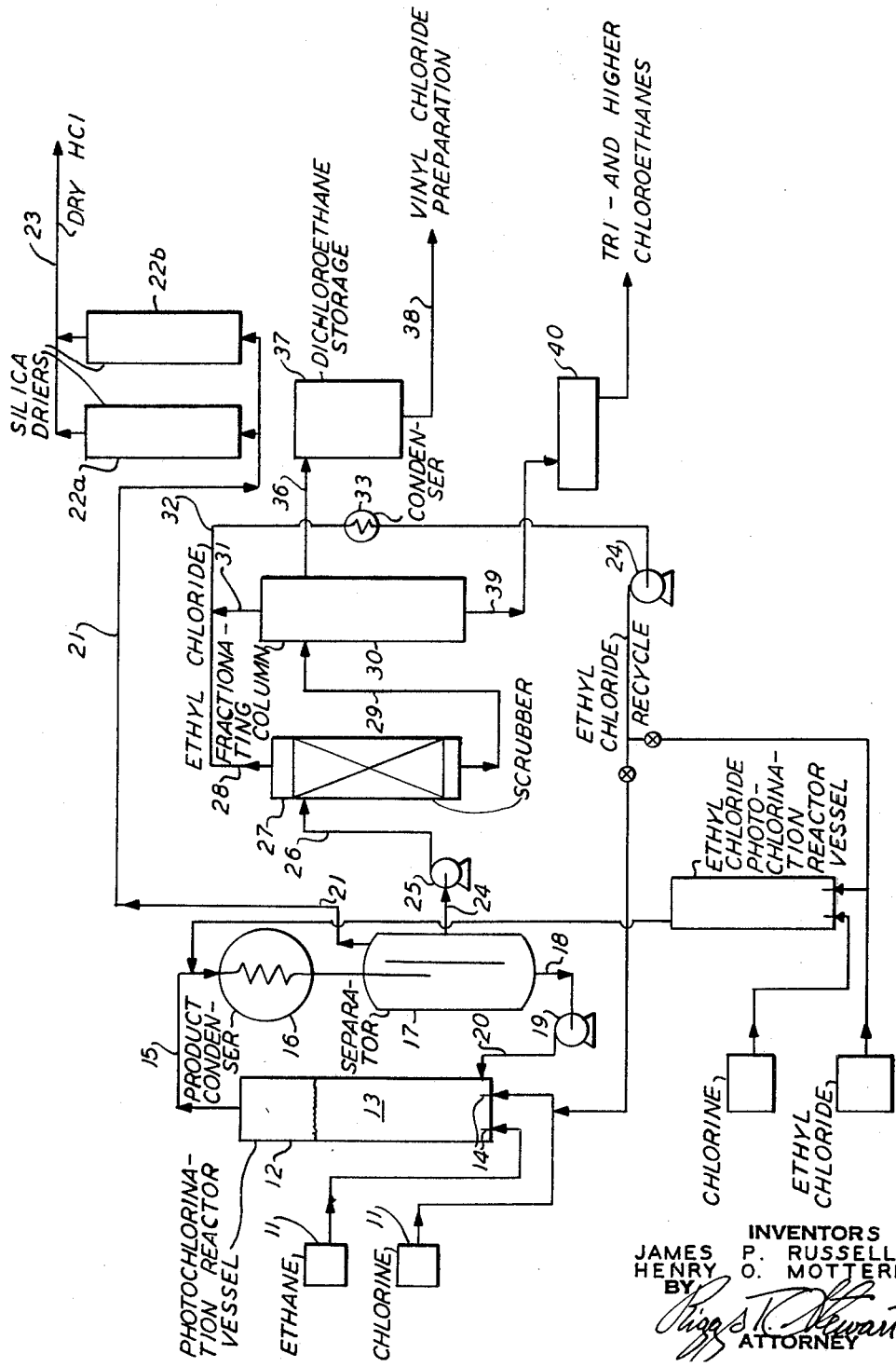

ABSTRACT OF THE DISCLOSURE

Dichlorethanes are produced by photochlorinating ethane alone or in combination with ethyl chloride by means of chlorine, reactants being dispersed in a reaction liquid maintained at about 20° to 70° C.

---

This invention relates to the preparation of organic compounds, more particularly to the production of dichloroethane by the photochlorination of ethane with separation of ethyl chloride formed in the reaction which is subjected to further chlorination either alone or in mixtures with ethane by recycling to the reaction zone.

It was proposed in U.S. Patent No. 2,393,509 to Archibald et al. that chlorination of saturated hydrocarbons be effected by passing gaseous hydrocarbons and chlorine through a reaction chamber containing a reaction liquid which aids in the chlorination of the hydrocarbons while exposing the reaction mixture to daylight, sunlight or any chemically-active artificial light. The data summarized in Table I and Table II on page 2 of said patent indicates that the maximum conversion of ethane, i.e. 58.1 to 72.1% is achieved when the ratio of ethane to chlorine in the feed is in the volume ratio of 1.18:1 to 1.55:1 and conversion to ethyl chlorides may run as high as 95% based on converted ethane. Dichloroethane represents a minor portion of the reaction products and apparently was not a desired end production.

Vinyl chloride is an extremely important starting material for the manufacture of a large variety of commercial plastics. The sharp competitiveness in the vinyl chloride monomer field has generated substantial interest in novel, low-cost methods for the manufacture of this monomer. In view of the fact that almost quantitative yields of vinyl chloride can be obtained by cracking dichloroethane, there is a substantial incentive to develop improved methods for the manufacture of this vinyl chloride precursor. Since ethane is a low-cost hydrocarbon, usually valued only as a fuel gas, a process for producing dichloroethane based upon ethane would be very attractive.

It is the object of this invention to provide an improved method for the manufacture of dichloroethane. It is a further object of this invention to provide a process for the production of dichloroethane in high yields by the photochlorination of ethane. These and other objects of this invention will be apparent from the detailed description which follows.

It has now been found that it is possible to control the photochemical reaction of chlorine with ethane in order to make specific chlorides of ethane higher than ethyl chloride and lower than tetrachloroethanes. In accordance with this invention chlorine and ethane are contacted in a gaseous dispersion in saturated hydrochloric acid at temperatures of from 20 to 80° C. while exposing the same to the action of light, preferably fluorescent light which serves as a source of free radicals to initiate the reaction. The space velocity or volume of chlorine and ethane passed through the reaction zone per hour divided by the volume of reaction fluid, e.g. concentrated hydrochloric acid, at rest in the reaction zone is maintained in the range of about 100 to about 1000 liters per liter per hour. At these space velocities, the HCl produced in the reaction serves to sweep the products higher in chlorine content than ethyl chloride and consequently having lower vapor pressures from the reaction zone. The products are condensed at about −5° C. and 99.8% HCl gas is taken off for purification and use in the process. The ethyl chloride formed in the reaction is separated from the di- and trichloroethane and subjected to further photochlorination to convert substantial portions thereof to the desired dichloroethane.

Reference is made to the accompanying drawing illustrating a diagrammatic flow plan of the process of this invention.

In the drawing 10 is a chlorine container and 11 an ethane container provide with suitable metering means for supplying these reactants at the desired rate to the photochlorination reaction vessel 12 containing a body 13 of a reaction liquid, preferably hydrochloric acid of about 30% concentration. Suitable means 14 such as coarse porosity sintered glass thimbles, porous refractory materials or mechanical means such as jets are provided to effect a fine dispersion of the chlorine and ethane as gas bubbles in the body of reaction liquid. The reactor vessel is provided with coils or other means for the circulation of water or other coolant to maintain the reaction liquid at the desired temperature. The reactor vessel is also provided with suitable means for exposing the dispersion of reactants in the reaction liquid to daylight or any chemically active artificial light, preferably fluorescent light. In view of the space velocities employed in the reactor vessel it is desirable to provide a demister or spray trap above the reactor vessel to separate reaction liquid entrained in the vaporous reaction products in order that the separated reaction liquid may be recycled to the main body of reaction liquid 13 in vessel 12.

The reaction products substantially free of entrained reaction liquid are passed via line 15 to product condenser 16 where they are cooled to about −5° C. and discharged into seperator 17. Concentrated hydrochloric acid is removed from separator 17 and passed through line 18, pump 19 and line 20 back into reactor vessel 12. 99.5% HCl, water and unreacted ethane are taken overhead from the separator 17 and passed via line 21 to silica driers 22a and 22b which are arranged in parallel so that one may be regenerated while the other is on steam. Dry gaseous HCl, about 0.01% H$_2$O and ethane representing about 3% of the ethane feed to the reactor vessel are removed from the driers 22a and 22b through line 23 and either recycled or used in other processes, for example the vapor phase oxychlorination of ethane to form vinyl chloride. The remainder of the reaction products are removed from separator 17 and passed through line 24, pump 25 and line 26 into packed liquid scrubber 27 where they are contacted with caustic soda at about 40° C. to free them of any chlorine or hydrochloric acid.

Ethyl chloride is taken overhead from scrubber 27 via line 28 and the remainder of the chlorinated ethane products are removed from the bottom of the scrubber and passed via line 29 to fractionating column 30. Ethyl chloride is taken overhead from column 30 via line 31 and combined with the ethyl chloride from line 28 and passed through line 32, cooler 33, pump 34 and line 35 for recycle with ethane feed to reactor vessel 12 for further chlorination.

Dichloroethane is removed from fractionating column 30 and passed via line 36 to storage tank 37 for passage, as desired, via line 38 to vinyl chloride preparation. The bottoms from the fractionating column consisting principally of trichloroethane with minor amounts of tetrachloroethane is passed to storage tank 40 or redistillation for further product segregation.

As an alternative to the recycling of the ethyl chloride to the ethane photochlorination reactor 12, the ethyl chloride may, in accordance with the present invention, be fed with chlorine to a separate photochlorination reactor for further chlorination by itself. The ethyl chloride photochlorination reactor would contain a body of reaction liquid, preferably concentrated hydrochloric acid, temperature control means, spray trap and means for exposing the reaction mixture to natural or artificial light, preferably fluorescent light as in the ethane photochlorination system. In addition it is advantageous to supply a diluent gas to assist in removing the dichloroethane and any higher chlorides formed from the reaction liquid in the ethyl chloride photochlorination reactor vessel. Gaseous HCl from separator 17 or from driers 22a or 22b can be used for this purpose. The reaction products from the separate ethyl chloride photochlorination can be combined with the products from the ethane chlorination reactor for product segregation.

In accordance with the present invention control of the ratio of chlorine to ethane and/or ethane-ethyl chloride mixtures is used to reduce polychlorination. Substantially all of the chlorine goes to ethyl chloride when chlorine in the feed gases does not exceed 25 mole percent. As the amount of chlorine is increased the amount going to dichloroethane increases until, at 45 mole percent, trichloroethane begins to form. At 47–49.5 mole percent chlorine, the amount of ethane converted to trichloroethane was 1–3%. Accordingly reduction of trichloroethane, as an undesirable by-product, to 1% or less requires a ratio of chlorine: ethane not exceeding 45 volume percent or 0.82 mole chlorine per mole of ethane. Chlorination done with 0.9 to 0.975 mole chlorine per mole ethane converted 55–60% of the ethane to ethyl chloride and 17% to dichloroethane. The trichloroethane was 1 to 3% and ethane recovered was 20–24% of that fed.

Maximization of the yield of dichloroethane from ethane can be attained in accordance with the present invention by employing the technique of recycling all of the ethyl chloride formed by the chlorination of ethane to the feed point of ethane for the photochlorination or by passing the ethyl chloride formed to a separate photochlorination reaction zone.

Photochlorination of ethyl chloride alone in a separate reactor is effected using 0.75 to 1.0 mole chlorine per mole of ethyl chloride. The amount of trichloroethane formed is slightly more than when equivalent chlorine concentrations are used on ethane-ethyl chloride mixtures. Conversions of ethyl chloride to di- and trichloroethanes are about 68–85% of which about 16–24% are trichloroethanes. The dichloroethanes produced used about 53–57% of the ethyl chloride which was substantially the same amount produced from ethane.

Various reaction liquids can be used but concentrated hydrochloric acid is preferred in spite of the fact that it presents a problem of corrosion of equipment from contact with moist HCl and chlorine. Acetic acid, acetic anhydride, perchloroethylene, perfluoro-tri-n-butylamine, "Halocarbon Oil 2.3/100" and 85% phosphoric acid may be used but are less suitable for various reasons. The various organic liquids tend to shift product distribution towards tri- and other polychloro ethanes. In addition, acetic acid gradually chlorinates to give mixtures of mono-, di- and trichloroacetic acids. Perchloroethylene reacts almost quantitively with chlorine to produce hexachloroethane. Acetic anhydride reacts with the HCl produced to give acetyl chloride which comes over with the products. The 85% phosphoric acid gave results comparable with concentrated HCl but being a very viscous liquid, the space velocity had to be maintained at a very low level to avoid foaming and excessive carryover of solvent.

Gas flow rates may be varied between about 100 to 1000 liters/liter HCl soln./hr. At low gas flow rates there is a tendency for dichloroethanes and higher chlorides to condense in the dispersion and settle out in the reactor leading to the formation of larger quantities of tri- and higher chlorides. At higher gas flow rates all products of chlorination are carried overhead in the vapor phase permitting better control of the chlorination. The maximum gas flow rate is determined by the ability of the reactor system to tolerate the gas flow without loss of liquid overhead by entrainment.

The temperature of the photochlorination of ethyl chloride and/or ethane ethyl chloride mixtures in aqueous HCl dispersions is preferably so limited that the water content of the product vapors does not exceed 5–8%. Where it is desired to recover HCl with a low water content, the required temperature would be below 70° C. Temperatures in the range of 38°–68° C. are preferred.

The pressure used during photochlorination has no effect upon the reaction rate or product distribution so long as it is not so high as to cause condensation of any chlorinated products at the temperature of chlorination. Accordingly, pressures may be in the range of from about 0.5 to 2 atmospheres.

Ethane photochlorinates with no significant decrease in conversion to ethyl chloride and dichloroethane at incident light intensities from about 440 foot candles down to as low as 85 foot candles, the latter corresponding to the attenuation of a 500 foot candle light source passing through 7 inches of gas-liquid dispersion. Daylight, sunlight or any chemically-active artifical light can be used to provide such incident light intensities. Fluorescent light tubes are the preferred light source from the standpoint of installation cost, power consumption and durability.

The following examples are illustrative of the present invention of photochlorinating ethane and ethyl chloride to form high yields of dichloroethane. The several runs were carried out in a reactor system as illustrated in the accompanying drawing. The reactor tube consisted of a 48 in. x 2 in. Pyrex tube which was fitted at the bottom with a drain stopcock, two gas inlet tubes with coarse porosity sintered glass thimbles, which reactor tube was positioned between two 48 in. 40 watt fluorescent tubes in such a manner that the light tubes and the reactor tube formed an isosceles triangle having a 5 in. base and 3 in. sides with the reactor tube at the apex. Table I below summarizes the reaction conditions maintained in the various runs and Table II the yields obtained.

TABLE I

| Run No. | Temp. (° C.) | Flow vel. (l. gas/l. soln./hr.) | Feed Rate (moles/hr.) | | | Mole ratio reactants (calcd. from prods.) | |
|---|---|---|---|---|---|---|---|
| | | | $Cl_2$ | $C_2H_6$ | $C_2H_5Cl$ | Initial vol. percent $Cl_2$ reactants | $Cl_2$:Et +EtCl |
| 148 | 37 | 350 | 8 | 4 | 2 | 57 | 1.4 |
| 150 | 37 | 350 | 8 | 5 | 1 | 57 | 1.52 |
| 152 | 37 | 350 | 8 | 3 | 3 | 57 | 1.8 |
| 156 | 37 | 350 | 8 | 4 | 2 | 57 | 1.63 |
| 158 | 37 | 350 | 8 | 5 | 1 | 57 | 1.56 |
| 162 | 68 | 375 | 9 | 3 | 3 | 60 | 1.84 |
| 164 | 58 | 375 | 4 | 3 | 3 | 60 | 1.95 |
| 166 | 48 | 375 | 9 | 3 | 3 | 60 | 1.91 |
| 168 | 38 | 375 | 9 | 3 | 3 | 60 | 2.0 |

TABLE II

| Run No. | Mole percent product distribution | | | | | Percent Conv. ethane | Ratio 1,1:1,2 $C_2H_4Cl_2$ | Ratio 1,1,1:1,1,2 $C_2H_3Cl_3$ |
|---|---|---|---|---|---|---|---|---|
| | $C_2H_6$ | $C_2H_5Cl$ | $C_2H_4Cl_2$ | $C_2H_3Cl_3$ | $C_2H_2Cl_4$ | | | |
| 148 | 10.0 | 52.7 | 26.8 | 9.3 | 1.3 | 90. | 3.35 | 0.84 |
| 150 | 8.1 | 51.4 | 33.4 | 6.9 | | 91.9 | 3.45 | 2.21 |
| 152 | 1.3 | 40.1 | 39.3 | 14.3 | 2.3 | 92.8 | 3.05 | 1.22 |
| 156 | 4.5 | 43.7 | 37.1 | 13.1 | 1.5 | 92.5 | 3.10 | 1.29 |
| 158 | 5.9 | 49.1 | 37.3 | 7.3 | Tr. | 93.8 | 3.40 | 1.71 |
| 162 | 1.7 | 26.9 | 48.0 | 22.1 | 1.1 | 97.8 | 3.45 | 2.10 |
| 164 | 2.6 | 25.9 | 46.8 | 23.7 | 1.2 | 97.2 | 3.43 | 2.53 |
| 166 | 2.9 | 24.5 | 51.7 | 20.3 | 0.6 | 97.1 | 3.43 | 2.03 |
| 168 | 2.3 | 21.9 | 52.6 | 21.0 | 2.3 | 99.2 | 3.81 | 1.21 |
| Average value | | | | | | | 3.50 | 1.67 |

The following examples are illustrative of the present invention involving the photochlorination of ethyl chloride alone to form dichloroethane particularly if used in combination with the photochlorination of ethane under conditions which minimize the formation of tri- and higher chloroethanes. Table III below summarizes reaction conditions in the various runs and Table IV the yields obtained.

TABLE III

| Run No. | Temp. (° C.) | Flow Vel. (l. gas/l. soln./hr.) | Feed Rate (moles/hr.) | | | Initial vol. percent $Cl_2$ reactants | Mole Ratio Reactants (calcd. from prods.) | |
|---|---|---|---|---|---|---|---|---|
| | | | $Cl_2$ | $C_2H_6$ | $C_2H_5Cl$ | | $Cl_2:C_2H_6$ | $Cl_2:C_2H_5Cl$ |
| 146 | 37 | 250 | 6 | 0 | 6 | 50 | | 1.97 |
| 170 | 58 | 350 | 7 | 0 | 7 | 50 | | 2.09 |
| 172 | 58 | 350 | 6 | 0 | 8 | 42.8 | | 1.86 |
| 122 | 37 | 200 | 4 | 4 | 0 | 50 | 1.97 | |
| 136 | 37 | 275 | 6 | 5 | 0 | 54.5 | 1.16 | |
| 138 | 37 | 300 | 6 | 6 | 0 | 50 | 0.9 | |

TABLE IV

| Run No. | Mole percent product distribution | | | | | Percent conv. ethane | Ratio 1,1:1,2 $C_2H_4Cl_2$ | Ratio 1,1,1: 1,1,2 $C_2H_3Cl_3$ |
|---|---|---|---|---|---|---|---|---|
| | $C_2H_6$ | $C_2H_5Cl$ | $C_2H_4Cl_2$ | $C_2H_3Cl_3$ | $C_2H_2Cl_4$ | | | |
| 146 | | 27.3 | 49.8 | 21.4 | 0.15 | *72.7 | 3.20 | 1.20 |
| 170 | | 17.6 | 57.0 | 24.5 | 1.0 | *84.6 | 4.04 | 2.15 |
| 172 | | 31.0 | 52.8 | 15.8 | 0.4 | *68.0 | 4.16 | 2.0 |
| 122 | 20.4 | 60.5 | 16.9 | 1.0 | | 79.6 | 2.90 | 1.30 |
| 136 | 18.7 | 53.0 | 23.7 | 4.5 | | 81.3 | 3.74 | 1.98 |
| 138 | 23.8 | 55.1 | 17.8 | 3.3 | | 76.2 | 3.44 | 1.96 |

* Percent $C_2H_5Cl$.

Two other runs which gave maximum yields of dichloroethane by photochlorination of ethane carried out in the same equipment and manner as the above at 37° C. at flow velocities of 150 and 300 l. gas/l. soln./hr. and feed rates of 4 moles chlorine and 2 moles ethane and 8 moles chlorine and 4 moles ethane respectively gave yields of 58.1 and 55.1 mole percent $C_2H_4Cl_2$ and 23.8 and 26.2 mole percent $C_2H_3Cl_3$ respectively. Charging mixtures of ethane and ethyl chloride in accordance with this invention, Run Nos. 166 and 168, it is possible to obtain yields of 51.7 and 52.6 mole percent $C_2H_4Cl_2$ with only 20.3 and 21.0 mole percent $C_2H_3Cl_3$. Averaging these runs it may be seen that while the photochlorination of ethane-ethyl chloride mixtures in accordance with the present invention yields 92.14% of the desired $C_2H_4Cl_2$ that is obtainable by the photochlorination of ethane alone it forms only 81.6% of the undesired $C_2H_3Cl_3$ that is formed in the photochlorination of ethane alone.

The advantages of the process of the present invention is substantially greater when comparing photochlorination of ethyl chloride alone (Run Nos. 170 and 172) with the above mentioned runs using ethane alone as the feed stock. As can be seen from Tables III and IV Run Nos. 170 and 172 yielded 57.0 and 52.8 mole percent $C_2H_4Cl_2$ and 24.5 and 15.8 mole percent $C_2H_3Cl_3$ respectively. Averaging these runs it may be seen that the process in accordance with the present invention yields 97% of the desired $C_2H_4Cl_2$ and only 80.6% of the undesired $C_2H_3Cl_3$ that are formed in the photochlorination of ethane alone.

The advantages of the present invention are also substantial in specific embodiment wherein ethane is photochlorinated alone in a first stage under conditions to form minimum amounts of $C_2H_3Cl_3$ (Run No. 122 or 136) separating the $C_2H_5Cl$ formed and then photochlorinating the ethyl chloride by itself as per Run No. 170 or 172. From the data in Tables III and IV it is calculated that Run No. 122 combined with Run No. 170 would yield about 57.6 mole percent $C_2H_4Cl_2$ and about 18 mole percent $C_2H_3Cl_3$ or about 63.88 mole percent $C_2H_4Cl_2$ and about 15.6 mole percent $C_2H_3Cl_3$ if combined with Run No. 172 while Run No. 136 combined with Run No. 170 would yield about 50.6 mole percent $C_2H_4Cl_2$ and 17.47 mole percent $C_2H_3Cl_3$ and about 56.76 mole percent $C_2H_4Cl_2$ and 14.9 mole percent $C_2H_3Cl_3$ if combined with Run No. 172. All of these combinations are characterized by high yields of the desired $C_2H_4Cl_2$ and low yields of the undesired $C_2H_3Cl_3$ averaging 57.13 mole percent of the former and 16.49 mole percent of the latter.

The present invention is not to be limited to the foregoing examples since numerous variations are possible without departing from the scope of the following claims.

What is claimed is:

1. The process of preparing dichloroethanes which comprises dispersing ethane and chlorine as fine gas bubbles in a body of hydrochloric acid or phosphoric acid maintained at a temperature of about 20° to 70° C., subjecting the dispersion of ethane and chlorine to the action of actinic light to initiate the reaction between ethane and chlorine, maintaining the flow velocity of the reactants between about 100 and 1000 liters per liter of reaction liquid per hour whereby the reaction products are rapidly removed from the reaction liquid, recovering dichloroethanes and ethyl chloride from the reaction products and subjecting the ethyl chloride to further photochlorination in the presence of actinic light to convert it to dichloroethanes.

2. The process as defined in claim 1 in which the ethyl chloride is photochlorinated in a separate reaction zone.

3. The process as defined in claim 1 in which the reaction liquid is concentrated hydrochloric acid, the ethyl chloride is photochlorinated in a separate reaction zone by charging 0.75 to 1.0 mole chlorine per mole of ethyl chloride to a body of a concentrated hydrochloric acid solution maintained at about 35° to 70° C. and the gas flow velocity through said body of acid is in the range of from about 100 to 1000 liters per liter of acid solution per hour.

4. The process as defined in claim 3, in which fluorescent light is employed.

5. The process as defined in claim 1 in which the ethyl chloride formed is recycled and photochlorinated in admixture with the ethane.

6. The process as defined in claim 1 in which the reaction liquid is a concentrated hydrochloric acid solution, the ethyl chloride formed is recycled to the body of hydrochloric acid solution for photochlorination in admixture with the ethane and the amount of chlorine charged is 0.75 to 1.0 mole per mole of ethyl chloride and 0.9 to 0.975 mole per mole of ethane.

7. The process as defined in claim 6, in which fluorescent light is employed.

8. The process of preparing dichloroethanes which comprises dispersing ethane, ethyl chloride and chlorine as fine gas bubbles in a body of hydrochloric acid or phosphoric acid maintained at a temperature of about 20° to 70° C., subjecting the dispersion of ethyl chloride and chlorine to the action of actinic light to initiate the reaction between ethyl chloride and chlorine, maintaining the flow velocity of the reactants between about 100 and 1000 liters per liter of reaction liquid per hour whereby the reaction products are rapidly removed from the reaction liquid and recovering dichloroethanes from the reaction products.

9. The process as defined in claim 8 in which the reaction liquid is concentrated hydrochloric acid and the gas fed to the reaction zone contains 0.75 to 1.0 mole chlorine per mole of ethyl chloride.

10. The process as defined in claim 8, in which fluorescent light is employed.

References Cited

UNITED STATES PATENTS

| 2,393,509 | 1/1946 | Archibald et al. | 204—163 |
| 2,589,689 | 3/1952 | Governale et al. | 204—163 |

BENJAMIN R. PADGETT, Primary Examiner

U.S. Cl. X.R.

204—162

UNITED STATES PATENT OFFICE
CERTIFICATE OF CORRECTION

Patent No. 3,506,553       Dated April 14, 1970

Inventor(s) Henry O. Mottern and James P. Russell

It is certified that error appears in the above-identified patent and that said Letters Patent are hereby corrected as shown below:

Col. 1, line 40, "production" should read -- product --.

Col. 2, line 16, "provide" should read -- provided --;
       line 47, "steam" should read -- stream --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents